April 7, 1931.  A. A. PRUDEN  1,799,567
VEHICLE WHEEL ATTACHMENT
Filed July 20, 1929
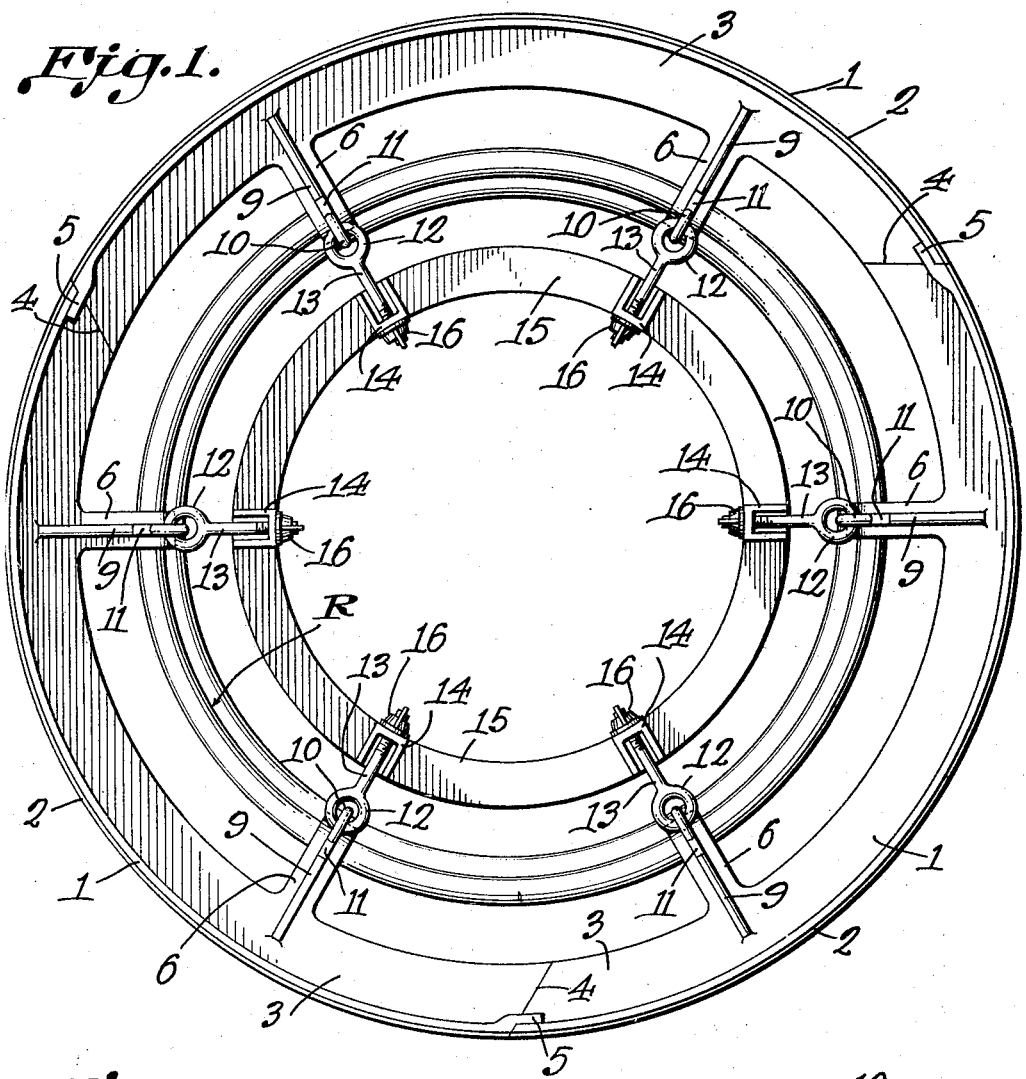
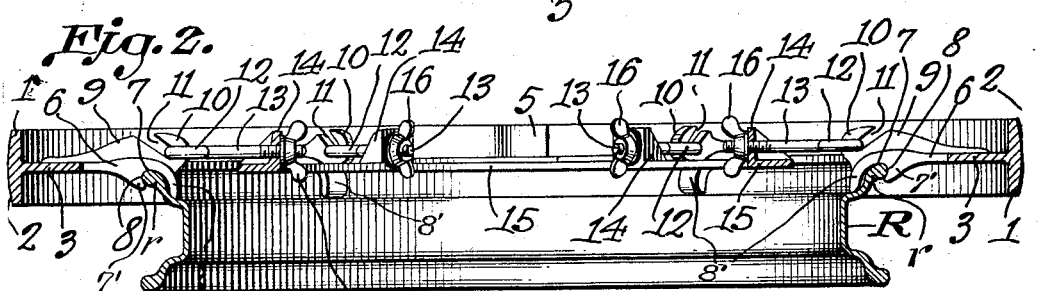
Andrew A. Pruden, Inventor
By C. A. Snow & Co.
Attorneys Patented Apr. 7, 1931

1,799,567

UNITED STATES PATENT OFFICE

ANDREW A. PRUDEN, OF NORFOLK, VIRGINIA

VEHICLE WHEEL ATTACHMENT

Application filed July 20, 1929. Serial No. 379,730.

This invention relates to an attachment for the wheels of automobiles, one of the objects being to provide a supplemental tread adapted to be applied to a wheel having a flat tire whereby it becomes possible to drive the vehicle to the nearest service station without injuring the tire.

Another object is to provide an attachment formed of sections which, when not in use, can be compactly stored but, when assembled and in use, will be properly held relative to each other.

A further object is to provide an attachment that can be quickly and easily attached to a wheel without requiring the use of any supplemental fastening means.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a side elevation of the attachment and the wheel rim to which it is applied.

Figure 2 is a transverse section through the structure shown in Figure 1.

Figure 3 is a perspective view of one end of one of the tread members.

Referring to the figures by characters of reference, 1 designates each of a series of segmental tread members. Each member has an arcuate tread portion 2 the outer surface of which is preferably transversely convexed while extending from the inner surface at the center thereof is a web 3 extending throughout the length of the section. The ends of these webs can be beveled as shown at 4 and one end of each section can have its tread portion offset inwardly to provide a forked seat 5 adapted to receive and lap the near end of the next adjoining section. The sections are so proportioned that when they are assembled end to end they will form a ring the diameter of which will be equal to or slightly greater than the diameter of an inflated tire on the wheel to which the attachment is to be applied.

Extended inwardly from the web 3 of each section are radial arms 6 each of which is provided in one side with a recess 7 adapted to receive and straddle the annular flange $r$ at one side of a wheel rim R. That end wall of each recess nearest the tread portion of the attachment is preferably concave as indicated at 8 so as to constitute a seat whereby thrust will be transmitted between the rim and the arm 6.

The rim-engaging portion of each arm 6 is located at one side thereof. This rim engaging portion includes a short finger 7' and a long arcuate finger 8', the two fingers being spaced apart so that the outer finger 7' will engage the outer periphery of flange $r$ while the long arcuate finger 8' will engage the inner periphery of said flange. Thus when the portion 2 of each tread member 1 is swung laterally relative to the rim R, these fingers will tend to pinch the flange $r$ so that the attachment will not slip circumferentially along the rim. Formed on the other side of each arm is a reinforcing rib 9 terminating in an ear 10 in which is formed a slot 11. This slot is open at one end and is obliquely disposed so that a hook is produced which will engage in the eye 12 of a bolt 13. One of these bolts is provided for each arm 6 and all of the bolts are extended through lugs 14 extended laterally from a ring 15. The diameter of this ring is less than the internal diameter of rim R. Wing nuts 16 or the like engage the bolts and bear upon lugs 14.

In practice the bolts are in engagement with the lugs but the tread sections of the attachment are disengaged from the bolts and can be stored one upon the other or side by side in a relatively small space. Should a tire become flat the attachment could be applied to the wheel by placing two of the sections 1 upon the upper portions of the wheel rim with one side of the rim entering the recesses 7. Bolts 13 are hooked into engagement with the ears 10. The vehicle is then moved forwardly or backwardly to bring one of the sections 1 beneath the wheel whereupon the remaining section 1 is placed in position and its arms 6 are engaged by the bolts provided therefor. All of the bolts are then tightened. It will be apparent by referring to Figure 2 that when the bolts 13 are tightened they will tend to swing the portion 2 of the tread members 1 laterally away from the rim R. This will cause the fingers 7' and 8' to pinch the flange r as heretofore explained.

By following the procedure outlined, the sections 1 will be held rigidly to the rim R and the attachment will be supported concentric with the rim. Thus said attachment will relieve the flat tire from the load that would otherwise be supported thereby and the vehicle can be driven any desired distance without causing injury to the tire.

Obviously the attachments can be made of different sizes to adapt them for use with wheels of different diameters. While it is prefered to make each attachment with its tread portion in three sections, the number can obviously be changed to meet the requirements.

The parts can be made of any desired metal of the requisite strength and weight.

By providing a device such as described, it becomes unnecessary to use jacks and similar devices for lifting a wheel to relieve the tire carried thereby.

What is claimed is:

1. An attachment of the class described including segmental tread sections, members extending inwardly therefrom for straddling and thrusting inwardly against one side portion of a wheel rim, and means for drawing said members toward each other along radial lines to bind the sections together and to hold the members in fixed engagement with the wheel rim, said means including a ring and adjustable and detachable connections between the ring and said members.

2. An attachment of the class described including segmental tread sections, radially disposed members extending inwardly therefrom, spaced fingers carried by said members and extending laterally in one direction therefrom for receiving between them one of the annular flanges of a wheel rim, fastener engaging means extending laterally in the opposite direction from said members, and detachably connected adjustable means converging toward each other on the fastener engaging means for drawing the ends of the said sections together and for exerting a transverse pull upon the inwardly extending members thereby to bind the fingers upon the engaged rim to pinch it and hold the attachment against circumferential movement relative to the rim.

In testimony that I claim the foregoing as my own, I have hereto affixed my signature.

ANDREW A. PRUDEN.